UNITED STATES PATENT OFFICE.

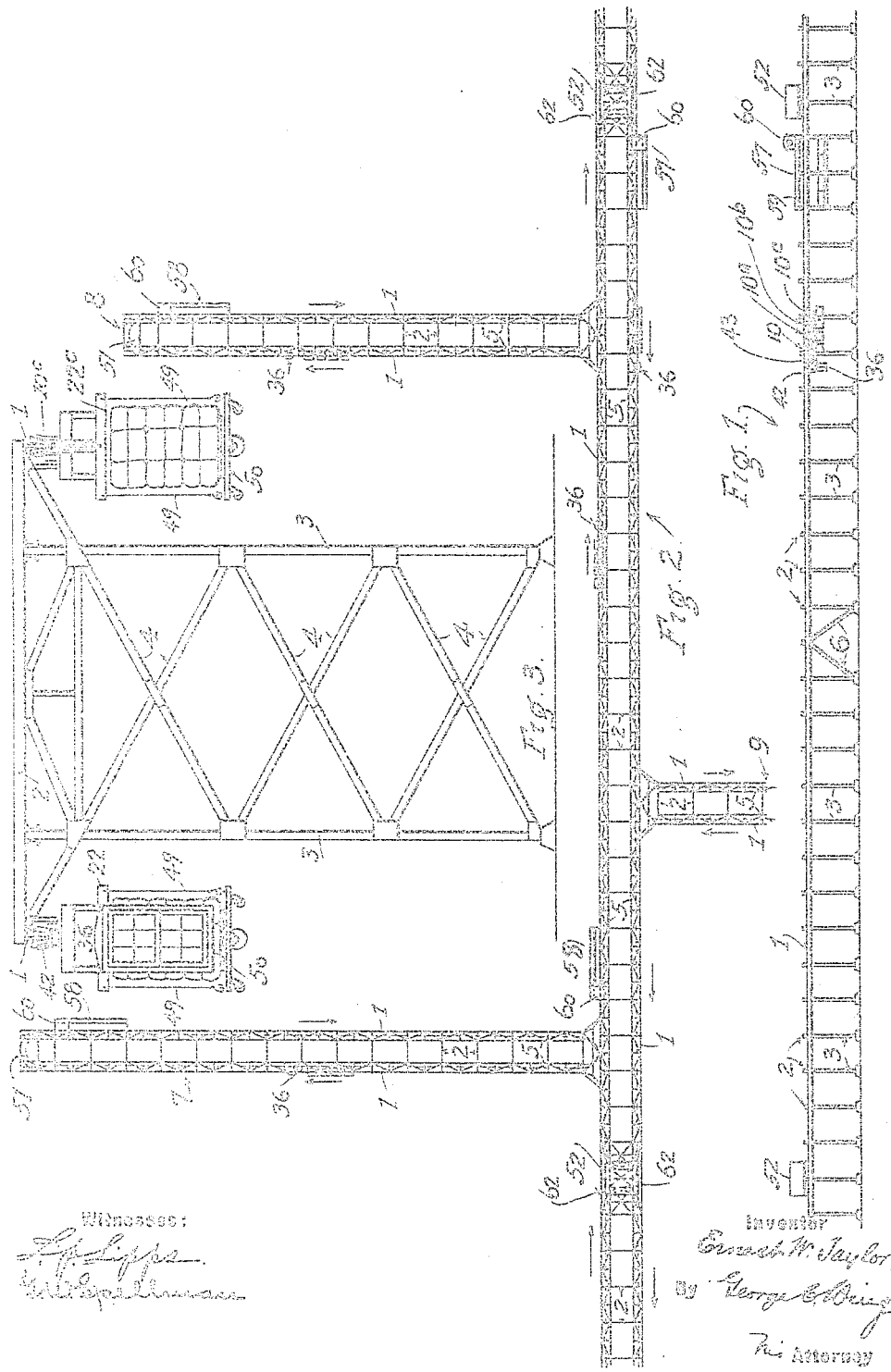

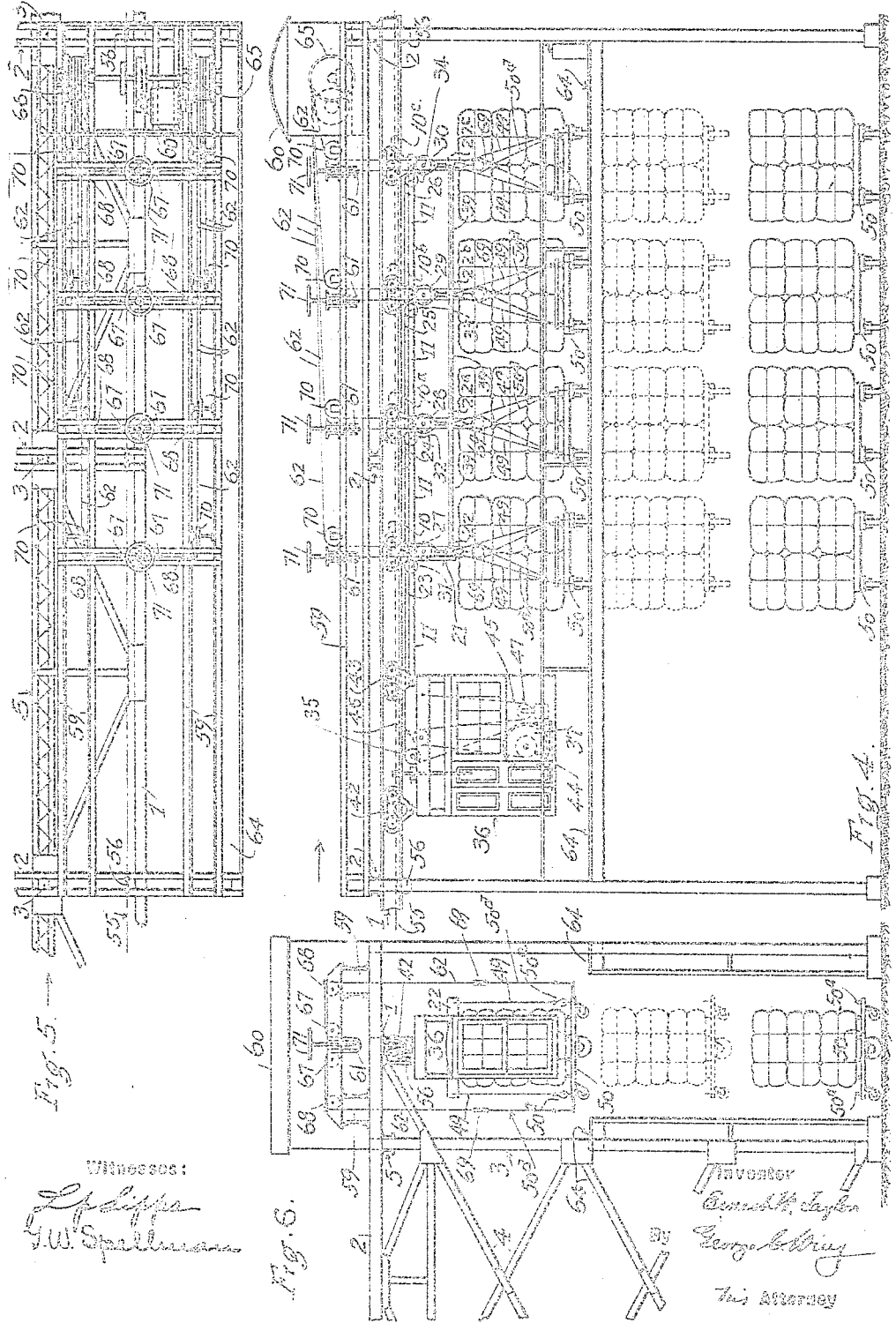

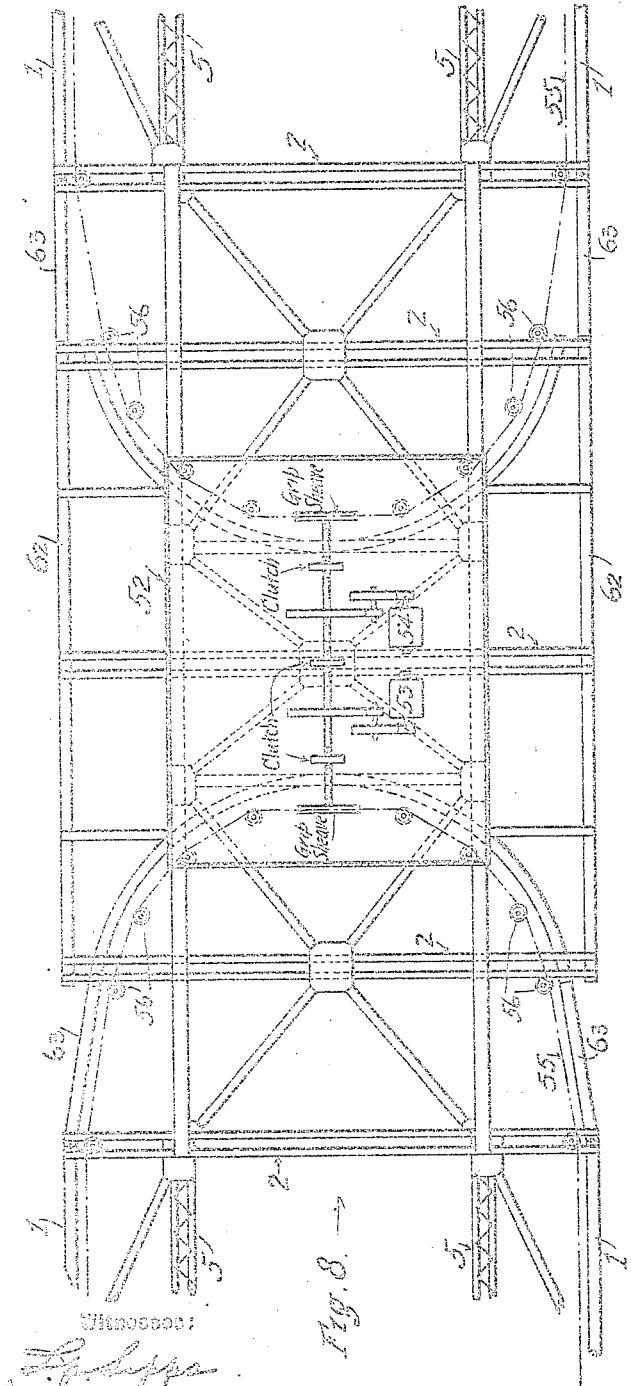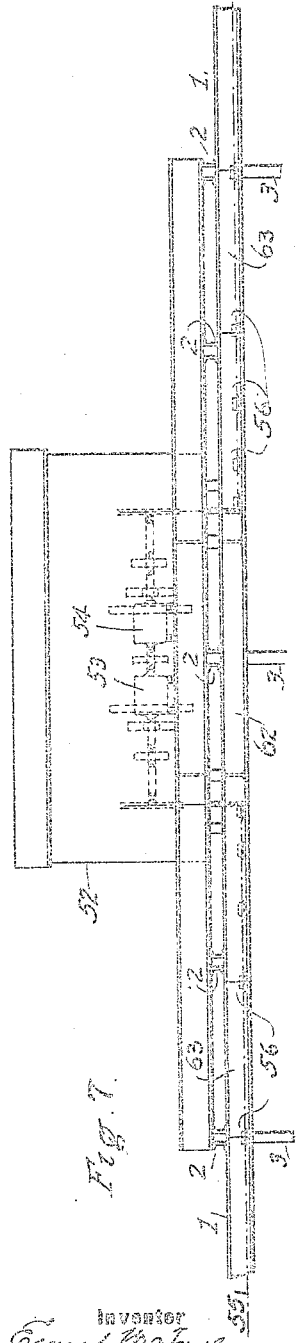

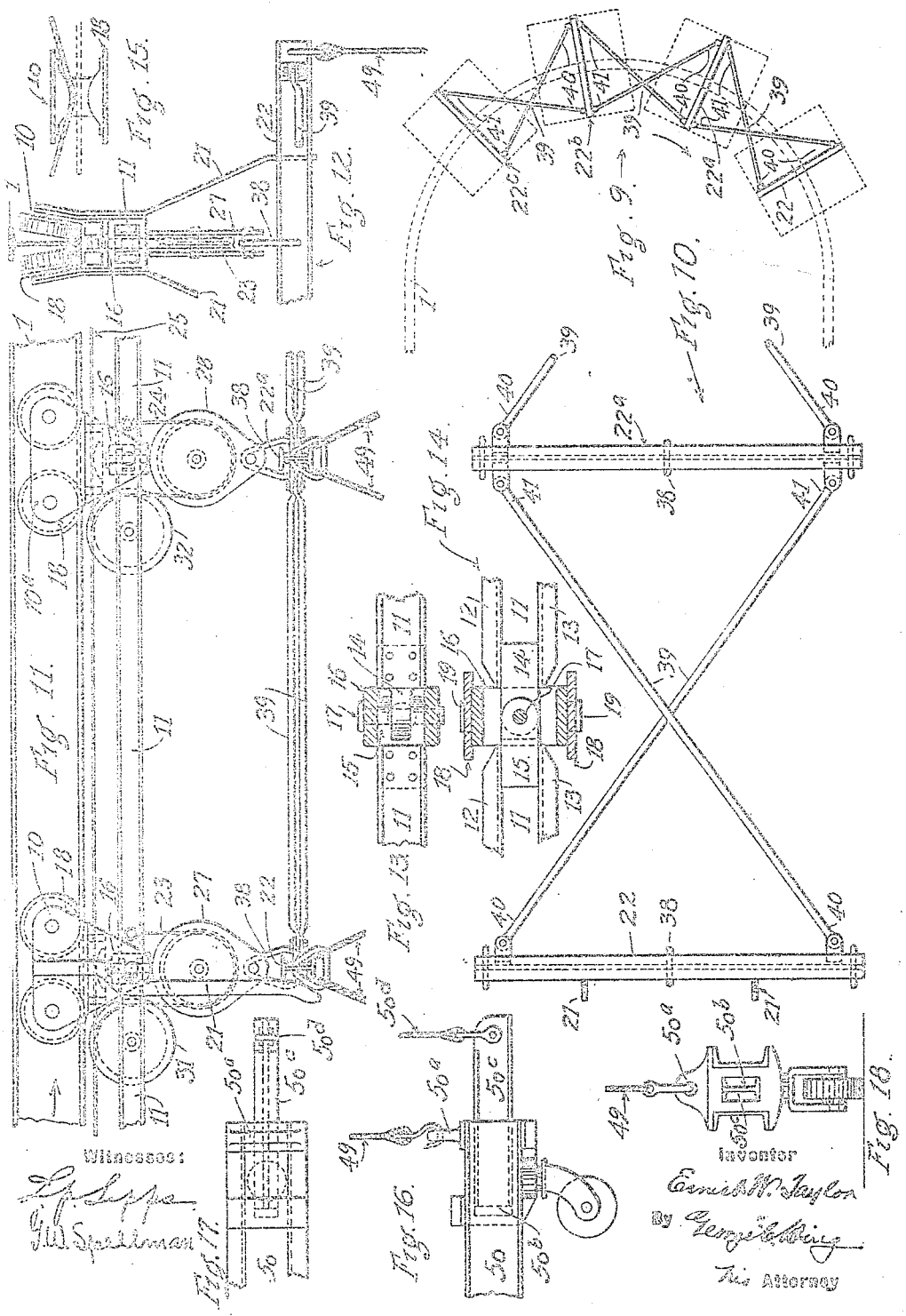

ERNEST W. TAYLOR, OF CLEVELAND, OHIO, ASSIGNOR TO THE BROWN HOISTING MACHINERY COMPANY, OF CLEVELAND, OHIO, INCORPORATED.

DEVICE FOR HANDLING FREIGHT.

1,055,231.

Specification of Letters Patent. Patented Mar. 18, 1913.

Application filed July 23, 1912. Serial No. 713,027.

*To all whom it may concern:*

Be it known that I, ERNEST W. TAYLOR, a citizen of the United States of America, residing in the city of Cleveland, in the county of Cuyahoga and State of Ohio, have invented a new and useful Device for Handling Freight, of which the following is a full, clear, and exact description, reference being had to the accompanying drawings, forming a part of the specifications, wherein similar parts are designated by the same numerals in each case.

The object of the invention is to afford a safe and efficient means for rapidly picking up heavy loads, packages or bales, at central stations or collecting points, and moving the same by overhead carriers, for any reasonable distance along a predetermined route, to boats or cars, from which the same are to be ultimately despatched.

As illustrated in the several figures herewith, the arrangement involves a unit or unitary system of overhead continuous trackways, trolley carriers, either singly or in trains thereon, and an operator's cage in each case, containing suitable appliances for controlling the vertical movements of the trucks by which the loads are suspended to the carriers. Further characterizing features are means for synchronously hoisting the loads to be conveyed to and into depending relations with the several carriers or trolleys employed, and, an endless chain or cable system for propelling the trains to their various destinations.

In the drawings Figure 1 is a side elevation of the several related features of the invention. Fig. 2 is a plan view of a special application of the same. Fig. 3 is a sectional view of the overhead trackway feature involved with loads in carrying suspension therefrom. Fig. 4 is a side elevation of a portion of the apparatus showing a train, at a loading station, ready for moving, the loads to be taken up by the next train being in their proper alinement below; the dotted lines in the figure indicate the elevated position this waiting load may be given, after the train is despatched and the next train is approaching, in order to clear a third load as the latter is brought in to its said alined relation. Fig. 5 is a plan view of the station shown in Fig. 4. Fig. 6 is an end view of Fig. 4 in the direction of the arrow in that figure. Fig. 7 indicates the cable operating mechanism employed in said means in its relative location between two adjacent units of the system. Fig. 8 is a plan view of Fig. 7. Fig. 9 illustrates a special arrangement for steadying the loaded trucks as they traverse a curve. Fig. 10 is a plan view of such an arrangement. Fig. 11 is a side view of the same in its relation to other connected features shown. Fig. 12 is an end view of Fig. 11, in the direction of the arrow. Fig. 13 is a side view of a trolley-coupling employed. Fig. 14 is a plan view of Fig. 13. Fig. 15 is a detail of rope-bearing-blocks in the trolleys. Fig. 16 shows a mode of effecting the engagement between the hoisting ropes and the load-carrying trucks. Fig. 17 is a plan view of Fig. 16, and Fig. 18 is an end view of Fig. 16.

As shown, the invention comprises either a single unit, as in Fig. 1, or a combination of two or more units into a correspondingly enlarged system. In either case, a distinctive feature of each unit involved is a continuous overhead loop or return trackway 1, along the space or distance to be served, supported in any suitable manner, as by the overhanging ends of cross-beams 2. The latter are themselves upheld by opposite posts 3, arranged in pairs, and duly strengthened in such parallel relation by diagonal bracings 4. The rectangular support-frames thus made up, are kept in an upright position, against longitudinal collapse, by parallel chords 5, extending between the several frame-members of the supporting structure, and intermediate thrust-members 6. Branch trackways, like 7, 8 and 9 may be similarly constructed at given points along the main line as desired.

One or more trains of overhead trolleys or carriers, 10, 10$^a$ 10$^b$ and 10$^c$, are mounted on said trackway. They are coupled together below, by rigid members 11, the latter being each made up of parallel channel-beams 12 and 13 riveted, alternately at their ends, to male and female swivel-blocks or castings 14 and 15. Said blocks are, in turn, connected together, in a corresponding joint, within a special box-shaped housing 16, and are held in such relation by a vertical hinge-pin 17 that passes through said housing and blocks. The housing itself is journaled to and between the trolley's side-plates 18 by trunnions 19 that have their bearing in holes in said plates provided for the purpose.

Beneath each trolley-carrier in a train (of four, for instance, as in Fig. 4), sheave-blocks 27, 28, 29 and 30 are severally suspended, from the members 11, by means of ropes 23, 24, 25, and 26, which extend downwardly from anchorages in said members at the rear of the trolleys, to and around said sheave-blocks in each case, thence upwardly and around sheaves 31, 32, 33 and 34 in said members 11, at the point of said trolleys, to a sheave 35 in the upper part of an operator's cage 36, at the foremost place in the train. From this point the ropes extend downwardly to a common winding-drum 37, in said cage, where they are fastened.

From each of the sheave-blocks, thus suspended, carrier-beams 22, 22$^a$, 22$^b$ and 22$^c$ are hung, cross-wise of the blocks and trolleys, by means of links 38 extending from their middle points. Ropes 49, for suitably hooking onto or otherwise engaging load carrying-trucks or platforms 50 provided for the purpose are fastened to the ends of said beams, and, in order to insure the same relative arrangement, at corresponding points on the trackway, between each trolley-member of a train and its cross-beam, I provide a form of equalizing coupling, between each pair of beams in the train, consisting of the diagonal rods 39 in pivotal connection, at their ends 40 and 41 with the opposite alternate ends of the cross beams constituting such pairs. Also, to maintain a fixed relation, under all circumstances, between said beams and their trolleys, it will be of advantage to provide one trolley member in each train with rigid arms 21 that extend downwardly on each side into bearing against the forward side of its depending beam.

The operator's cage 36, above referred to, is of the usual type and dimensions for the class of functions required. It is swively suspended from the track 1, by trolleys 42 and 43, and is coupled to its train by a beam 11, as in the case of the trolley-carriers it precedes and controls.

One office of the drum 37 being to wind up the several ropes 23—26 and the carrier-beams suspended thereby, when the loaded trucks 50, have arrived at their destination and been lowered below the trackway 1 and unhooked, I provide a suitable counterweight system of ropes, sheaves and drums in said cage to automatically actuate the drum 37 in this movement. Said system is made up of a counterweight sheave 47 of sufficient weight, in the circumstances for the purpose, held in suspension by a rope 45 that is anchored, at one end, to the upper portion of the cage, and passes downwardly, to and around the counterweight-sheave, upwardly to and around a fixed sheave 46 in said portion, and thence downwardly to and reversely around a secondary drum 44 which is upon and keyed to the shaft of the winding drum 37.

For each trolley-carrier that is to be employed in the system in question a suitable truck, or platform 50 is provided to hold the load in the process. As shown, these are in the form of rectangular portable platforms with eyes 50$^a$ at each corner, whereby engagement with the carrier-bar ropes 49 may be effected, and, also, with lateral socket-castings 50$^b$ at these corners to receive eye-beam plugs 50$^c$ on the lower ends of the sling-lines 50$^d$.

In order to raise the trucks from their place of loading into an alined position for engagement by the carrier-bar rope 49, I provide stationary hoisting mechanism and tackling contrivances for the purpose at stated points in each unit of said system. In the figures these stations are indicated by 57 and 58, and as consisting of longitudinal frame-work structures projecting laterally from the track-way 1 and carrying supporting girders 59 lengthwise and at each side of the top. Upon one end of these girders is built up a motor-house 60, containing mechanism which, besides the motor equipment required, controls an equalizing rope and sheave system for each trolley to be used, that is adapted to engage the trucks at each side, and evenly, and simultaneously, as respects the several members of a train, hoist the same to the proper height and place for the engagement desired. To this end fixed or resisting sheaves 61, are located centrally along the top of said structure, at intervals corresponding with the distance between the members of a trolley-train, and hoisting ropes 62, reeved in the scores on the lower circumference of the same, are carried upwardly on each side, to and over a pair of subordinate sheaves 67 and 68, in the same plane as the sheaves 61, downwardly from the outer member of said pairs 68, to and around hoist-block sheaves 69, at points below, that are equidistant from the vertical from the sheaves 61, thence, upwardly to and over sheaves 70 in the top of the station-structure, and backwardly, in parallel lines, to winding drums 65 and 66, in said house, to which the ends of the ropes 62 are respectively fastened. Said drums are of the same size and are keyed to the same driving shaft and are duly equipped with braking control. To permit the several hoisting ropes, that are to operate with respect to a given station, to be equalized so that the loads shall be hoisted in unison in all respects, I provide a means (indicated by 71) for adjusting the resisting sheaves 61 accordingly. Briefly stated, this means consists in mounting the sheave 61 in a manner that will permit its operative position to be changed in a vertical direction by manipulating the wheel and screw denoted by 71. The hoist-blocks sheaves 69 may be furnished with hooks to engage the sling-lines 50ᵈ.

Near the ends of a given unit when but a single circuit or continuous overhead trackway is used, or intermediately between adjacent units in a combination of the same into a more extensive system, are located the necessary power stations for hauling the trains. These stations are indicated at the points 51 in the drawings, as single, or adapted to serve but one trackway, in the side branches (Fig. 9) and, at the points 52 as double or adapted to serve both trackways, in the main line. The latter, or dual arrangement of circuits (Figs. 2, 7 and 8) contains motors 53 and 54 which, by a system of shafts and grip-sheaves, duly denoted, engage and thereby operate overhead trolley-cables 55 that are carried, on roller bearings 56, in suitable proximity to the I-beam trackway throughout its course. When but one unit is to be served the corresponding motor arrangement will be manifest.

To connect the several units, in a compound system, subsidiary tracks 62 may be interposed between and in alinement with the main tracks, with switch-segments 63 at each end of the same. In Fig. 8 these switches are shown in both open and closed position. The trolley must, of course, be carried over the subsidiary tracks and switch segments by its own momentum.

The ideas above explained may be equally embodied in operative constructions although varied as to many of the features shown. Instead of a cable-system, for instance, for traversing the trolley-carriers, electric locomotives or traveling motors may be employed to advantage under certain supposable conditions. In the greater uses of the invention, however, it is probable that the form of utilizing the same specially illustrated herein will be generally followed.

In handling cotton bales by an overhead system, for example from compressors to boats or cars, or general freight from or to warehouses, stores or docks, it is of much importance to reduce to a minimum the danger of igniting the loads, or intervening objects. The elimination of the sparking from one means, conductors or wiring, that the adoption of a cable tramway, as described effects, is in such uses a most valuable result. So too, while a continuous system of this type might substitute an elevator platform for the means shown of hoisting the loaded trucks to their trolley-engagements, such change would be at the expense of speed; the elevator platform would have to be lowered to its full travel before the packages or loaded trucks could be brought to the place for their hoist, instead as (as shown in Fig. 4) the moment that the previous load has been raised clear of such place.

When freight is to be handled by the method described, the four portable trucks to be presently carried, are loaded at the source of supply in close proximity to a station 57, and alined up in said station, each truck beneath the corresponding trolleys (10, 10ᵃ, 10ᵇ, 10ᶜ) and hoist-block sheaves 69, above. The several ropes 62 are now paid out from the two drums 65 and 66 until the sling-lines 50ᵈ, on the hoist-block sheaves 69 are connected at their ends by the plugs 50ᵉ, with the trucks, whereupon said drums are reversed. The ensuing upward movement of the loaded trucks will be simultaneous. When the trucks are thus brought beneath their respective carrier beams, 22, 22ᵃ, 22ᵇ, 22ᶜ, the drum 37 being held under brake, the ropes 49 on said beams are hooked to the eyes 50ᵃ on the trucks, and the sling lines 50ᵈ disengaged therefrom. The loaded trucks are now depending from the trolleys alone, the train may at once be started toward its destination, and the hoist-block sheaves 69 again lowered to engage a second series of loaded trucks, that in the meantime, has been assembled beneath for the purpose.

When a train reaches an unloading station 58 (which is in all respects identical with the loading stations 57) the process may be reversed, by engaging the sling-line with the trucks, disengaging the ropes 49, unbraking the drum 37, and then lowering the train; or the trucks may be lowered to the unloading level by simply paying out the several lines around the drum 27. In either case, as will be evident, as soon as the lines 49 are released from the lowered trucks, the several carrier-beams, by reason of the then superior force of the counterweight sheave 47, will instantly, but with duly diminishing speed, be returned upward to their normal positions beneath the trolleys. If the unloaded trucks are to be returned to a loading station by the same, or a subsequent train of trolley-carriers, the reëngagement of the trucks to the carrier beams will, of course, be effected by the hoisting apparatus as in the case of loaded trucks.

Elevated side-walks, or stations, for operatives who are to effect the foregoing engagements and disengagements of the trucks and trolley-carriers are indicated at 64, in Fig. 6.

Having thus described my said invention what I claim and wish to protect by Letters Patent is:—

1. A system for handling freight comprising the combination, with an overhead tramway, of trolleys thereon connected together in a train, an operator's cage movably suspended from said trackway and connected with said train, devices for tackling the loads to be carried by the trolleys, suitable rope and drum mechanism located in said cage, and connected with said devices, for, severally, suspending the same beneath the trolleys when in engagement with their loads, lowering said devices, and their engaged loads, from said points of suspension, and, automatically raising the devices to the trolleys upon their release from said engagements at intermediate points below, together with loading and unloading stations along the line of said tramway provided with suitable means for engaging loads at said stations and simultaneously hoisting the same to and beneath the trolleys of such train, and for engaging loads, when suspended from said trolleys, as aforesaid, and simultaneously lowering the same therefrom when released from said suspension, substantially as shown and described.

2. In a device for handling freight, the combination, with an overhead tramway, of trolleys thereon connected together and to an operator's cage movably mounted upon the same, devices for tackling the loads to be carried by said trolleys, a suitable rope and drum mechanism located in said cage, and connected with said devices, for, severally, suspending the same beneath the trolleys when in engagement with their loads, lowering said devices and their engaged loads from said points of suspension and, automatically, raising the devices to the trolleys upon their release from said engagements at intermediate points below, together with suitable means, at predetermined points along said tramway, for engaging loads to be suspended, as aforesaid, and hoisting the same to and beneath said trolleys, substantially as shown and described.

3. In a device for handling freight, the combination, with an overhead tramway, of trolleys thereon connected together and to an operator's cage movably mounted upon the same, devices for tackling the loads to be carried by said trolleys, a suitable rope and drum mechanism located in said cage and connected with said devices, for, severally, suspending the same beneath the trolleys when in engagement with their loads, lowering said devices and their engaged loads from said points of suspension, and, automatically raising the devices to the trolleys upon their release from said engagements at intermediate points below, together with suitable means, at predetermined points along said tramway, for engaging loads to be suspended, as aforesaid, and simultaneously hoisting the same to and beneath said trolleys, substantially as shown and described.

ERNEST W. TAYLOR.

In the presence of—
L. P. LIPPS,
E. G. DEUCHER.